Sept. 22, 1970     T. B. BAKER ET AL     3,529,664

END STRUCTURE FOR THERMOPLASTIC TUBING

Filed April 23, 1969     2 Sheets-Sheet 1

INVENTORS
THOMAS B. BAKER
KIT P. CARSON
HARRY W. SANDBERG
BY *Herbert M. Wolfson*
ATTORNEY Sept. 22, 1970  T. B. BAKER ET AL  3,529,664
END STRUCTURE FOR THERMOPLASTIC TUBING
Filed April 23, 1969  2 Sheets-Sheet 2
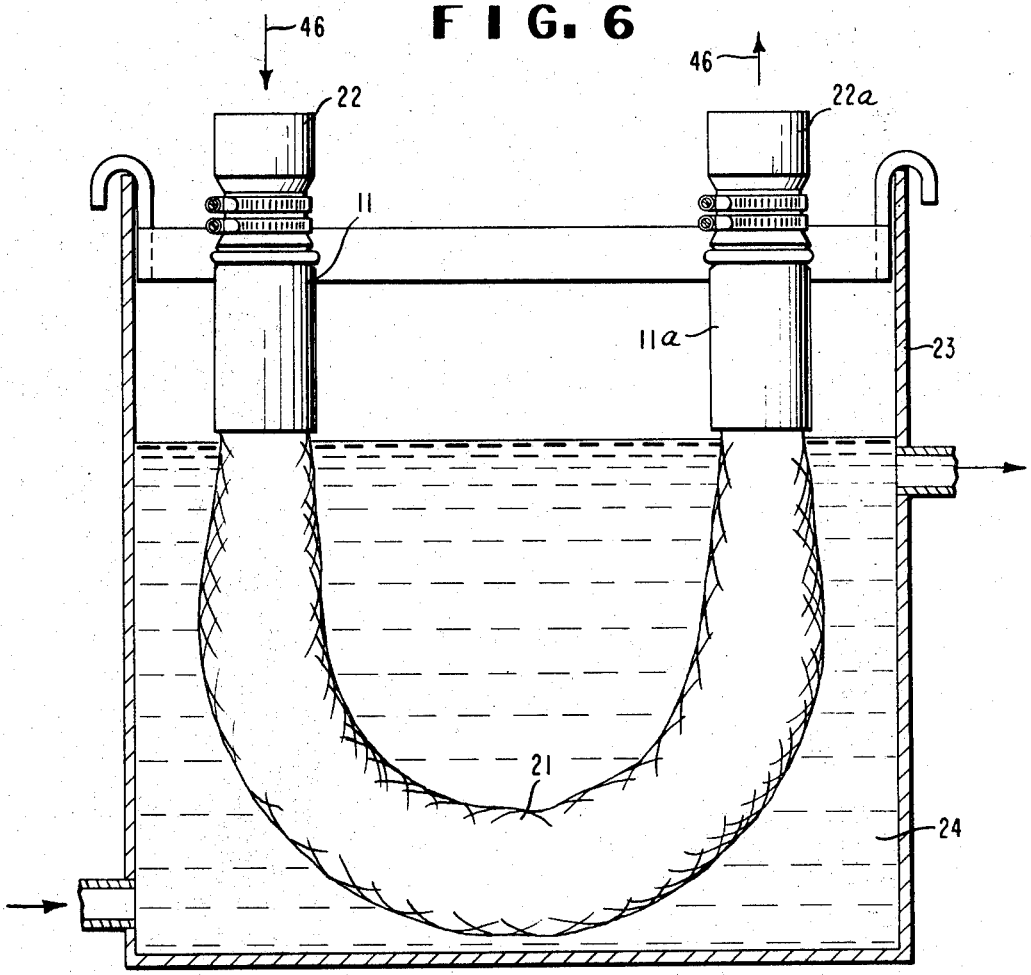
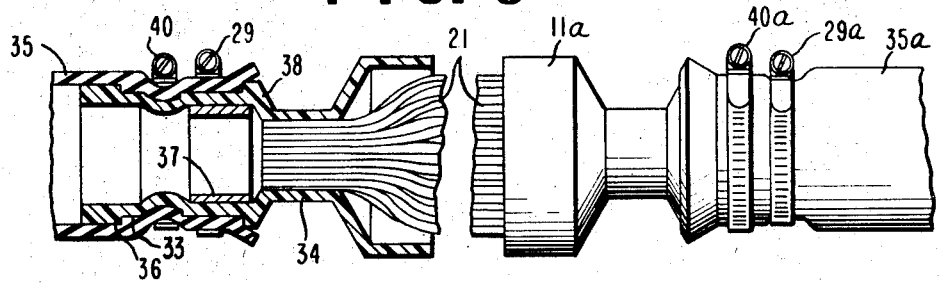
INVENTORS
THOMAS B. BAKER
KIT P. CARSON
HARRY W. SANDBERG
BY *Herbert M. Wolfson*
ATTORNEY United States Patent Office 3,529,664
Patented Sept. 22, 1970

3,529,664
END STRUCTURE FOR THERMOPLASTIC TUBING
Thomas B. Baker, Kit P. Carson, and Harry W. Sandberg, Wilmington, Del., assignors to E. I. du Pont de Nemours and Company, Wilmington, Del., a corporation of Delaware
Filed Apr. 23, 1969, Ser. No. 818,492
Int. Cl. F16l *39/00;* F28f *9/04*
U.S. Cl. 165—178                 10 Claims

ABSTRACT OF THE DISCLOSURE

An article of manufacture designed to be secured to radially deformable hosing by means of hose clamps, which comprises at least one thermoplastic sleeve, a bundle of parallel flexible thermoplastic tubes, and a rigid collar. The sleeve consists of a least two cylindrical portions, of different diameter, and a short connecting portion, connecting the two cylindrical portions. The flexible tubes are bonded to one another at the end of the bundle and bonded to the wall of the small diameter portion of the sleeve in a leak-tight arrangement. The rigid collar is disposed within the sleeve in the region of the large diameter portion, and acts as an unyielding surface to which the hose clamps secure the hose and the large diameter portion of the sleeve. A depression, with a sharp cornered shoulder, wide enough to accommodate the hose clamps, is provided in the outer surface of the large diameter portion of the sleeve in substantially the same region of the sleeve as the collar. When a radially deformable hose is secured to the sleeve in the region of the depression by hose clamps, the collar and the shoulder of the depression cooperate with the hose clamps to provide a burst tight-seal.

BACKGROUND OF THE INVENTION

Connecting a thermoplastic tube or bundle of tubes to another structure can present some difficulties, especially when the seal between the two articles must withstand cyclic vahriations in temperature and pressure. This is true with all thermoplastics, because they will deform under pressure at elevated temperatures and take a set in the form that they assume, but it is particularly true for fluorocarbon thermoplastics both because of their tendency to cold flow and because of their low coefficient of friction.

If a thermoplastic tube is to be connected directly to a rigid pipe, there is no real problem. The thermoplastic tube is merely designed to fit over the end of a pipe, which has a number of threads cut into it. When the tube is secured to the pipe by means of hose clamps the seal between them is strong enough to withstand quite severe variations in temperature and pressure.

If it is necessary to have a flexible connection between the pipe and tube, such as that provided by a hose, then the problem of sealing the hose to the tube becomes more difficult. The hose cannot merely be slipped over the end of the thermoplastic tube and secured by hose clamps, even if the tube has a threaded end. Unless the tube is almost a solid cylinder, the pressure required to make the seal would collapse the tube. A simple solution to this might be found in providing a bearing surface, in the form of a rigid collar inside the thermoplastic tube, which would withstand the clamping pressure and keep the tube from collapsing. When there is no pressure and temperature variation, or very little, this is a possible solution. If the temperature and pressure vary, however, two factors arise to defeat this solution. First, the collar has a tendency to work its way out of the tube under the cyclic action of the variation. Second, as soon as the temperature is increased, the thermoplastic flows, reducing the pressure between the two surfaces so that the seal is no longer strong enough to withstand the variations. As indicated above, the problem of sealing is even more difficult in the case of tubing made from fluorocarbon thermoplastic such as Teflon® FEP fluorocarbon resin, which is a copolymer of tetrafluoroethylene and hexafluoropropylene, because in these plastics, material flow occurs even when the thermoplastic is cold. Their low coefficient of friction coupled with the reduced pressure between the two surfaces due to this flow allows the hose to pop off the tube very easily, especially when the temperature and pressure of the fluid passing through the tube varies continually.

When there is no variation in temperature and pressure, conventional sealing means are sufficient for most thermoplastics. This may not be entirely true for flourocarbon thermoplastics, especially when the seal must withstand a constant high pressure, because the material cold flows; but at least there are conditions under which conventional sealing will suffice, even for the fluorocarbon thermoplastics, and for which an improved sealing structure is not necessary. At the other end of the spectrum, however, there are combinations of conditions, especially when variations occur, which are severe enough so that conventional sealing will not suffice and an entirely new sealing structure is required. An example of this would be when the fluid flowing through the pipe and tube changes from cold water at 80 p.s.i.g. to steam at 40 p.s.i.g. In between these two extremes, an improved seal may be desirable but not absolutely necessary.

SUMMARY OF THE INVENTION

The present invention relates to an improved end structure for thermoplastic tubing which can be employed under most circumstances but which is particularly useful when a hose must be secured to the tubing and a seal maintained under the servere conditions discussed above. Accordingly, one object of the present invention is to devise a structure which, when incorporated into the end of a thermoplastic tube, can be secured to radially deformable hose by means of hose clamps in a manner such that it will withstand severe variations in temperature and pressure.

The problem discussed above is of no consequence if thermoplastic tubing is not necessary. One situation where thermoplastic tubing is necessary is where the tubing is in contact with corrosive fluids. Teflon® heat exchangers for use with corrosive fluids are an example of such a situation. In this case a bundle of a plurality of parallel Teflon® tubes must be joined at the end of the bundle in a leak-tight arrangement and eventually joined to a supply pipe so that fluid flowing through the pipe will pass through the tubes. Another object of this invention, therefore, is to devise a structure in which the end of a bundle of a plurality of small diameter, parallel, thermoplastic tubes, which have been bonded together in a leak-tight arrangement, can be secured to a radially deformable hose by means of hose clamps, in a manner such that the seal between the hose and the bundle will withstand severe variations in temperature and pressure.

A structure which accomplishes these objectives comprises a thermoplastic sleeve, a thermoplastic tube or a bundle of tubes bonded together at their ends, and a rigid collar. The sleeve is in the form of a cylindrical tube having a small diameter portion and a large diameter portion connected together by a connecting portion which is essentially a discontinuity in the cylindrical shape of the sleeve. The tube, or bundle of tubes, is bonded to the internal wall of that portion of the sleeve having the small diameter, in a leak-tight arrangement. The collar is disposed within the large diameter portion of the sleeve, and a depression adapted to receive the hose clamp is cut in the outer surface of the large diameter portion, spanning substantially the same region of the sleeve as the collar. The end of the depression which is to extend furthest into the hose is defined by an annular shoulder which is wide enough to withstand the forces tending to deform it and has a sharp corner on the upper edge defining the depression. When a hose is slipped over the large diameter portion of the sleeve and secured to the sleeve by hose clamps, the collar acts as an unyielding surface for the hose clamps to clamp the hose and large diameter portion of the sleeve against, and the sharp cornered shoulder on the depression cooperates with the collar and the hose clamps to form a seal between the sleeve and the hose which will withstand severe variations in temperature and pressure. The collar is restrained from working its way out of the sleeve by using an extra hose clamp to deform the sleeve behind the collar.

The operation and advantages of the present invention can best be described by reference to the following figures:

FIG. 1 is a view, partially sectional and partially external, of one embodiment of the present invention in which a bundle of tubes, used as a heat exchanger, is secured to a flexible hose;

FIG. 5 is a view, partially sectional and partially external, of another multi-tube embodiment of the present invention;

FIG. 6 is a cross-sectional view of the heat exchanger of FIG. 1 in operative arrangement.

DETAILED DESCRIPTION OF DRAWINGS

The following discussion will be primarily concerned with a structure for securing multi-tube bundles to a radially deformable hose. Single tube constructions will only be discussed in conjunction with FIG. 3. The reason for this concentration is the present need for an improved sealing structure for use in heat exchangers made entirely from fluorocarbon thermoplastics. The discussion is broadened to include single tubes to show that the present invention is useful in a wider range of applications than discussed and to suggest one such application.

Figure 1A:
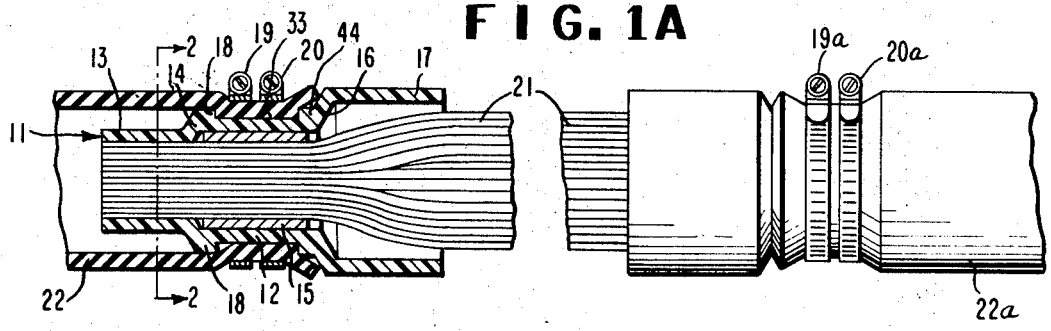
FIGS. 1A and 1C illustrate two operative embodiments of the critical groove and collar arrangement.

From the sectional view on the left side of FIG. 1A it can be seen that the thermoplastic sleeve 11 is essentially cylindrical in shape and has a first substantially cylindrical portion 12, a second substantially cylindrical portion 13 with an internal and external diameter less than the respective internal and external diameter of the first portion, and a short connecting portion 14. The connecting portion connects the first and second cylindrical portions by what amounts to a discontinuity. The connecting portion is short with respect to the first and second portions, and can be either an abrupt discontinuity or a gradual discontinuity. The reason that the discontinuity is kept short is so that the rigid collar 15, which is disposed in the sleeve within the recess provided by the difference in the internal diameters of the first and second portions, will have a shoulder, provided by the connecting portion, to block its movement towards the small end of the sleeve. If the discontinuity is too gradual, the position of the collar would be too indefinite. It would be best if the connecting portion were at right angles to the cylindrical portions, but it is not necessary.

The collar 15 can be made from any convenient rigid material. A metal such as stainless steel would be one such material. The collar is designed to fit tightly within the first portion of the sleeve, as shown, and can be pressed fit or shrunk fit into place, if desired. As illustrated in FIG. 1A the sleeve has a second connecting piece 16 and a third and larger, cylindrical portion 17. These last two portions facilitate construction of a shell type heat exchanger, as shown in FIG. 5, but are not essential to the structure.

The first cylindrical portion 12 has a depression circumscribing its outer surface. The end of the depression which is to extend furthest into the hose is defined by a shoulder 18 which is wide enough to withstand the forces tending to deform it and has a sharp corner on the upper edge defining the depression. As illustrated in the figures, this depression is in the form of a groove 33 which contains two shoulders 18 and 44 defining the depression. This is a preferred embodiment, but the single shoulder depression will suffice. In the figures, two hose clamps 19 and 20 are provided so the groove must be large enough to accommodate both of them.

Figure 2:
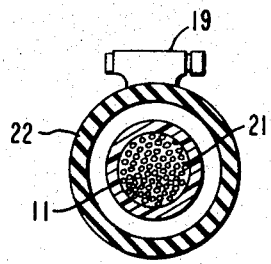
FIG. 2 is a transverse sectional view along the plane 2—2 of FIG. 1.

A bundle of a plurality of essentially parallel thermoplastic tubes 21 is gathered at one end of the bundle and inserted into the sleeve through the metal collar to completely fill the second cylindrical portion of the sleeve 13. The walls of these tubes are bonded together and the walls of the peripheral tubes are bonded to the internal surface of the second portion of the sleeve. In normal circumstances, and especially if the structure is to be used as a heat exchanger, the tubes must be bonded together and bonded to the wall in a leak-tight arrangement. FIG. 2 illustrates a transverse view along the plane 2—2 of FIG. 1A, illustrating how the walls of the tubes are bonded together. One convenient way to accomplish this is by heating the second portion of the sleeve while the tubes are in place in a manner such as that described in U.S. Pat. 3,315,740 issued to M. S. Withers on Apr. 25, 1967, but any convenient means of bonding the particular materials used would be sufficient. Once the tubes have been bonded to the sleeve it is often convenient to trim the end of the structure until it is squared, as shown.

The sleeve and the tubes can be made from any thermoplastic material, and need not be from the same material. The structure described above, however, is particularly useful when the tubes and sleeves are made from Teflon® FEP fluorocarbon resin, which is a copolymer of tetrafluoroethylene and hexafluoropropylene. The sleeve can be manufactured in any way known to those skilled in the art. One convenient way to do this is to blow mold the structure. Another way would be by injection molding.

The structure is designed so that when the hose 22 is slipped over the sleeve 11, it fits tightly over the outer surface of the first cylindrical portion 12 of the sleeve. The hose is usually made from some elastomeric material, such as rubber, or a reinforced elastomeric material, such as the material from which a stem hose is made, but this is not necessary. Elastomeric materials are preferable, but other materials can be used. All that is necessary is that the hose be radially deformable. The hose clamps are placed over the hose and tightened against the sleeve which is prevented from collapsing by the collar 15 which acts as an unyielding bearing surface for the first portion of the sleeve. The ability to exert pressure against an unyielding surface is not, in itself, enough to form a secure seal for the most severe variations in operating conditions. In these cases the depression is a necessary feature of the structure. When the hose clamps press the radially deformable hose against the sleeve, part of the hose is pressed into the depression and retained there. The depression, to be effective, must have at least one sharp cornered shoulder, i.e. the edge of the depression which extends furthest into the hose must be at right angle to the surface of the cylinder. It is this shoulder of the depression that grips the hose when the forces exerted on it tend to dislodge it from the sleeve. As illustrated, a groove 33 is a preferred type of depression. The groove has two sharp cornered shoulders 18 and 44 defining the depression. While the shoulder furthest from the connecting portion is not necessary, it may be helpful in some circumstances as a second biting surface. In the discussion which follows, the depression will, for convenience, be referred to as a groove. Even though the sleeve can be blow molded, the groove must be placed in the sleeve by some means, such as machining, which will produce sharp corners. Alternatively, the shoulders can be added to the sleeve by building up the shoulders from some material which can be fused to the sleeve. The sharp corners effectively bite into the hose like teeth and cooperate with the collar to secure the hose in a manner that will withstand severe variations in pressure and temperature.

The depth of the groove is critical. It must be deep enough to provide enough bite on the hose. When the first portion of the sleeve has a diameter of 1.5", a groove 0.06" deep has been found to be sufficient to form a seal between the nose and sleeve which will withstand a cyclic variation from cold water at 80 p.s.i.g. to steam at 40 p.s.i.g. passing through the hose, whereas the structure without the groove would not withstand the variation. As the diameter of the sleeve varies, the depth of the groove necessary to secure the hose will vary also. The deeper the groove, so long as the wall of the second portion of the sleeve does not get too thin, the stronger the seal. The depth of groove required also depends on the condition the seal must withstand. Even for a sleeve with a diameter of 1.5", if only a slight variation in conditions is contemplated, a groove with a depth of less than 0.06" would undoubtedly suffice. Somewhere below this depth, however, the effect of the groove is lost.

Figure 1B:
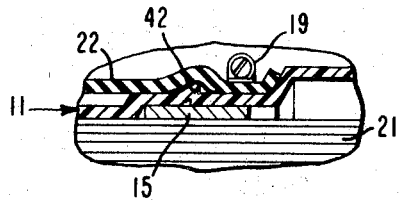
FIG. 1B, for comparison, illustrates an inoperative embodiment of the same arrangement.

At first, it would appear that virtually any tooth-like structure, such as that shown in FIG. 1B, would be as effective as a groove or depression in securing the hose. This is not true. Such a conclusion overlooks the fact that thermoplastics flow, at least at elevated temperatures, and that most of the tooth-like structures that one can conceive of, to replace the groove, will either be deformed away at elevated temperatures, under the pressure of the hose clamp, or are extremely difficult and expensive to produce. For example, the tooth 42 shown in FIG. 1B which is illustrated as if it had been blow molded into the sheath, has been found to be ineffective. At elevated temperature and pressure, the tooth is deformed downward, to fill the void below it formed in blow molding, and its effect is lost. It would be possible to machine such a tooth without the void, but even a machine tooth would not be as effective as the groove or depression because the narrowness of the sharpest portion of the tooth makes it extremely susceptible to permanent deformation under the elevated conditions discussed above. Only by extending the amount of material behind the ramp of the tooth can such an effect be overcome. When this is done the tooth effectively becomes the shoulder discussed in conjunction with FIG. 1A. For this reason the shoulder, in addition to having a sharp corner at its upper surface, must be wide, i.e. the width of the annular region must be enough to support the sharp corner and minimize deformation. Imparting some width to the shoulder also provides a surface in contact with the hose which increases the force required to dislodge the hose because of the friction between the two surfaces. The wider the shoulder the better, but it has been found that a width of ¼" will suffice for a groove of 0.06" depth on a sleeve 1.5" in diameter.

Figure 1C:
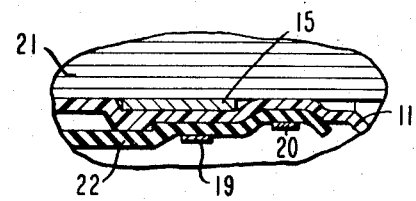

As illustrated in FIG. 1A, collar 15 is secured in place in a manner such that it cannot move towards the small diameter portion of the sleeve. There is no restriction against it moving in the other direction. Normally this is not a problem because expansion of tubes 21 into a larger diameter bundle has a tendency to secure the collar. Under these circumstances the preferred arrangement is as shown in FIG. 1A, where the collar spans the entire region covered by the groove so that both hose clamps will bear down on the collar. In some circumstances, however, such as when a single tube is used, as in FIG. 3, or when the collar is not secured by the bundle, it may be desirable to lock the collar into place by deforming the sleeve around it as shown in FIG. 1C. In this case the width of the collar is chosen so that it spans only a portion of the region covered by the groove. The hose clamp closest to the connecting portion bears down on material supported by the collar, while the other hose clamp, bearing down on unsupported material, will deform the sleeve around the collar as shown.

As shown in FIG. 1A both ends of tube bundle 21 are bonded to separate sleeves 11 and 11a which are in turn secured to hoses 22 and 22a by hose clamps 19, 20, 19a and 20a. Such an arrangement can be used as a heat exchanger, as shown in FIG. 6, where the sleeves 11 and 11a are suspended above a tank 23 containing a fluid 24. The tube bundle 21 hangs down into the fluid. The temperature of the fluid 24 can, therefore, be controlled by the temperature of the fluid 46 which flows in through pipe 22 and out through pipe 22a.

Figure 3:
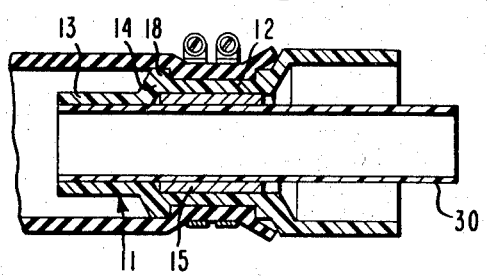
FIG. 3 is a cross-sectional view of another embodiment of the present invention in which a single tube is secured to a flexible hose.

The above discussion has been concerned primarily with a structure used to secure the end of a bundle of thermoplastic tubes to a hose. In FIG. 3 it is apparent that the same structure can also be used to secure the end of a single tube 30 to a hose 22. The design and construction of the sheath 11, and the collar 15 are identical to that shown in FIG. 1A. The only difference being that it is a single tube which is bonded to the inner surface of the second cylindrical portion of the sleeve 13, instead of the walls of the peripheral tubes in bundle tubes, as discussed above.

Figure 4:
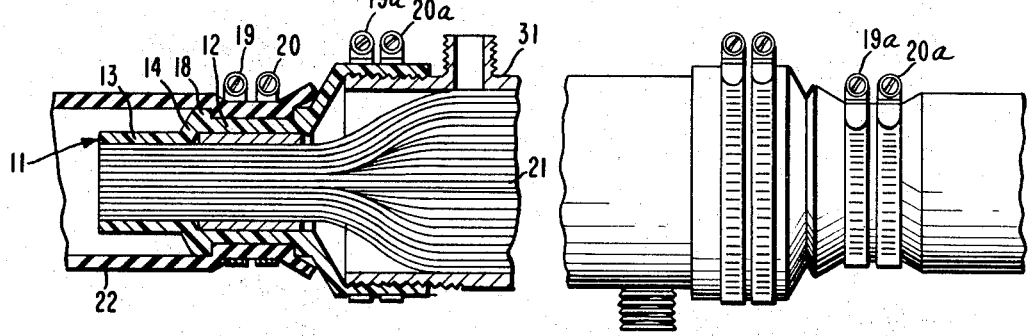
FIG. 4 is a view, partially sectional and partially external, of a multi-tube embodiment of the present invention, as used in a heat exchanger, incorporating a further seal between the structure and the shell of the heat exchanger.

FIG. 4 is identical to FIG. 1A except that a metal shell 31 has been placed between sheath 11 and 11a to form a shell type heat exchanger. The ends of the metal shell have been threaded and the third cylindrical portion of each sheath has been slipped over the threaded ends of the shell, and secured to the shell by means of hose clamps. Since the material from which the shell is made is not deformable, a collar is not necessary to provide a bearing surface, and the tooth arrangement, which was not sufficient to secure the hose to the sheath, is sufficient to form a seal securing the sheath to the shell.

The arrangement shown in FIG. 1A, where the small diameter end of the sheath, to which the bundle of tubes is bonded, is located at the outer end of the structure, is the most convenient to produce. This is true for a number of reasons. First it is easier to trim the end of the tubes. Second the collar is normally locked in place by the ridge formed by the connected portion of the sheath and the expanding bundle of tubes so that it is normally not necessary to deform the sheath around the collar. Finally, if deforming the sheath around the collar is necessary or advisable, such deformation is done in the region furtherest from the effective edge of the groove which bites into the hose preventing its movement. This is a preferred embodiment, but it is not the only embodiment. FIG. 5 illustrates a configuration in which the first portion of the sleeve 33 is on the outside of the structure rather than the second portion of the sleeve 34. The tubes within the bundle 21 are still bonded together and in turn bonded to the internal surface of the second portion of the sleeve, but in this case the tube bundle does not necessarily extend into the hose 35. The first portion of the sleeve still has a depression 33 with a sharp cornered shoulder 36, and the collar 37 is still positioned within the first portion of the sleeve, in the region closest to the connecting portion of the sleeve 38. In this case, however, since the cyclic variation in conditions would definitely have a tendency to work the collar free from its position, the sleeve must be deformed around the collar. This is accomplished in the same way as discussed above, by using a collar wide enough to act as a bearing surface for only one of the hose clamps 39, and using the other hose clamp 40, in an unsupported region of the sheath, to deform the sheath around the collar. Care must be taken in this configuration so that the deformation of the sheath used to lock the collar in place does not also deform the effective biting edge 36 of the groove, since a sharp cornered edge is an essential feature of the structure. In the configuration shown in FIG. 1A, it is natural for the depression to take the form of a groove, since this is the easiest structure to machine into the sleeve. In FIG. 5, a single shouldered depression could just as conveniently be cut into the sleeve.

As indicated above, the structure used for securing the tube or bundle of tubes to a hose has been found to be especially effective in solving the problem of securing the ends of heat exchangers made entirely from Teflon® FEP fluorocarbon resins. It is to be understood, however, that this structure is not limited to that use, and that the invention described above is useful in all applications where a tube or bundle of tubes made from a thermoplastic are to be joined to a radially deformable hose.

What is claimed is:

1. An end structure for thermoplastic tubing, designed to be secured to a radially deformable hose by means of hose clamps, which comprises:
   (a) a thermoplastic sleeve with a first substantially cylindrical portion adapted to fit tightly within said hose, a second substantially cylindrical portion having a smaller internal and external diameter than the respective internal and external diameters of said first portion and a short connecting portion connecting said first and second portions, said first portion having at least one depression adapted to receive at least one hose clamp circumscribing its outer surface, the end of said depression extending furthest into said hose being defined by an annular shoulder having a width sufficient to prevent deformation of said shoulder and a sharp corner on the upper edge of said shoulder defining said depression;
   (b) a bundle of a plurality of substantially parallel flexible thermoplastic tubes, one end portion of said bundle being disposed within said sleeve and the walls of said tubes at the end of said bundle disposed within said sleeve being integrally bonded to the walls of adjacent tubes and the walls of the peripheral tubes of said bundle being integrally bonded to the internal surface of the second portion of said sleeve in a fluid-tight arrangement; and
   (c) a rigid collar with a length substantially equal to the length of the first portion of said sleeve and an outer diameter substantially equal to the inner diameter of the first portion of said sleeve, said collar being disposed within the first portion of said sleeve in a manner such as to provide a substantially unyielding bearing surface for the first portion of said sleeve whereby the hose clamps can secure the hose to the first portion of said sleeve without collapsing said sleeve.

2. An article of manufacture as described in claim 1 wherein said depression in the first portion of said sleeve is a groove with two sharp cornered shoulders, said groove being adapted to receive at least one hose clamp.

3. An article of manufacture as described in claim 2 wherein said collar is a metal collar.

4. An article of manufacture as described in claim 3 wherein said collar is shrunk-fit into said sheath.

5. An article of manufacture as described in claim 1 wherein said sheath and said tubes are made from a copolymer of tetrafluoroethylene and hexafluoropropylene.

6. An article of manufacture as described in claim 1 wherein said bundle is disposed within said sleeve in a manner such that said bundle completely fills the second portion of said sleeve and the end of said bundle is flush with the end of the second portion of said sleeve furthest from the first portion of said sleeve, and wherein said collar is disposed adjacent to said connecting portion.

7. An article of manufacture as described in claim 1 wherein the width of said depression is sufficient to accommodate two hose clamps and the length of said collar is less than the width of said depression, said collar being disposed in a manner such as to provide an unyielding surface for the hose clamp nearest to the second portion of said sleeve but not for the hose clamp furthest from the second portion of said sleeve.

8. An article of manufacture as described in claim 7 wherein said bundle is disposed within said sleeve in a manner such that said bundle completely fills the second portion of said sleeve and the end of said bundle is flush with the end of the second portion of said sleeve nearest to the first portion of said sleeve.

9. An article of manufacture, designed to be secured to radially deformable hosing by means of hose clamps, which comprises:
   (a) at least one thermoplastic sleeve with a first substantially cylindrical portion adapted to fit tightly within said hosing, a second substantially cylindrical portion having a smaller internal and external diameter than the respective internal and external diameters of said first portion and a short connecting portion connecting said first and second portions, said first portion having at least one depression adapted to receive at least one hose clamp circumscribing its outer surface, the end of said depression extending furthest into said hose being defined by an annular shoulder having a width sufficient to prevent deformation of said shoulder and a sharp corner on the upper edge of said shoulder defining said depression;
   (b) a flexible thermoplastic tube, at least one end of said tube disposed within said sleeve, the walls of said tube being bonded to the internal surface of the second portion of said sleeve in a fluid-tight arrangement; and
   (c) a rigid collar with a length substantially equal to the length of the first portion of said sleeve and an outer diameter substantially equal to the inner diameter of the first portion of said sleeve, said collar being disposed within the first portion of said sleeve in a manner such as to provide a substantially unyielding bearing surface for the first portion of said sleeve whereby the hosing clamps can secure the hosing to the first portion of said sleeve without collapsing said sleeve.

10. In a heat exchanger comprising two thermoplastic sleeves; a bundle of flexible thermoplastic tubes, each end portion of said bundle being disposed within one of said sleeves, and the walls of said tubes at the ends of said bundle being bonded together and to the walls of said sleeves in a leak-tight arrangement; radially deformable hosing, secured to said sleeves by means of hose clamps, for passing one fluid into the interior of said tubes; and means for passing a second fluid about the outer surface of said tubes; the improvement wherein each of said sleeves consists essentially of a first substantially cylindrical portion adapted to fit tightly within said hosing; a second substantially cylindrical portion, having a smaller internal and external diameter than the respective internal and external diameter of said first portion; a connecting portion connecting said first and second portions, said first portion having at least one depression adapted to receive at least one hose clamp circumscribing its outer surface, the end of said depression extending furthest into said hosing being defined by an annular shoulder having a width sufficient to prevent deformation of said shoulder and a sharp corner on the upper edge of said shoulder defining said depression; and a rigid collar with a width substantially equal to the width of the first portion of said sleeve and an outer diameter substantially equal to the inner diameter of the first portion of said sleeve, said collar being disposed within the first portion of said sleeve in a manner such as to provide a substantially unyielding bearing surface for the first portion of said sleeve whereby the hosing clamps can secure the hosing to the first portion of said sleeve without collapsing said sleeve.

References Cited

UNITED STATES PATENTS

| | | | |
|---|---|---|---|
| 2,356,333 | 8/1944 | Matter | 285—236 X |
| 3,224,795 | 12/1965 | Conley | 285—423 X |
| 3,268,654 | 8/1966 | Morrison et al. | 285—236 X |
| 3,315,740 | 4/1967 | Withers | 165—178 X |
| 3,363,680 | 1/1968 | Baker | 165—178 X |
| 3,419,069 | 12/1968 | Baker et al. | 165—180 X |

FOREIGN PATENTS 582,849  8/1933  Germany.

DAVE W. AROLA, Primary Examiner

U.S. Cl. X.R.

285—41, 137, 236, 370, 423